Aug. 13, 1968 N. TSARNAS 3,396,949
AERATOR FOR WATER-CONTAINING VESSEL

Filed March 22, 1967 2 Sheets-Sheet 1

INVENTOR.
NICHOLAS TSARNAS

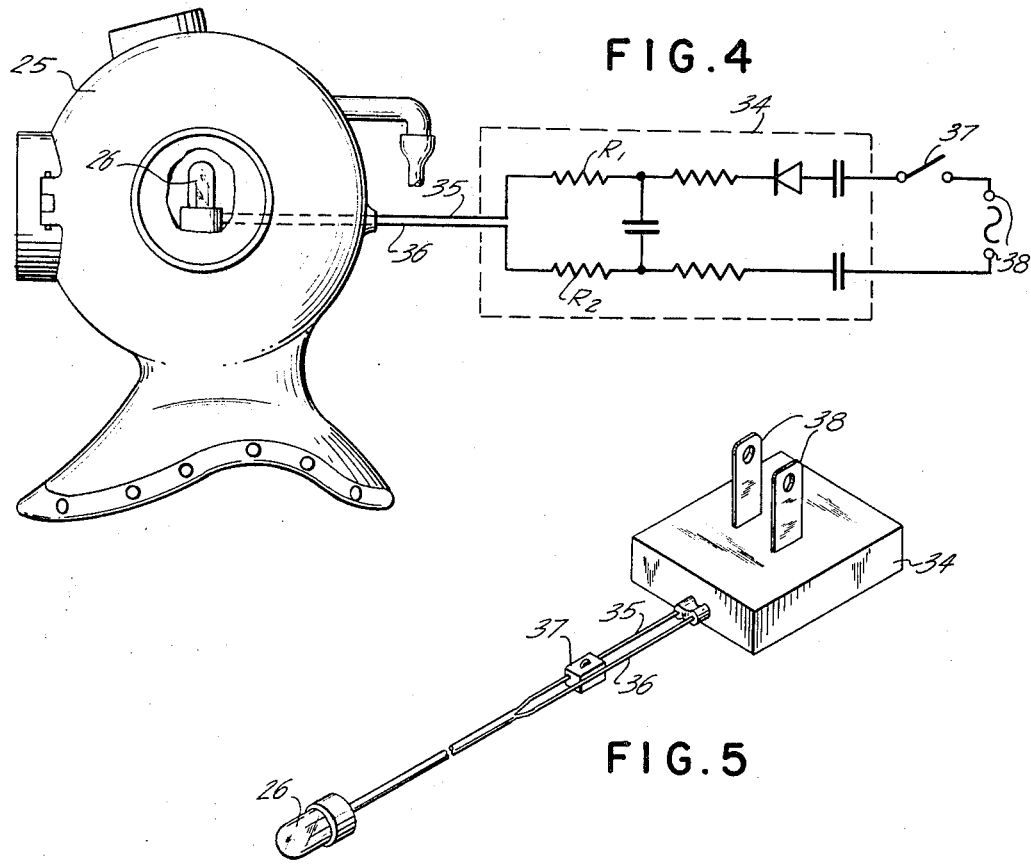
FIG.4
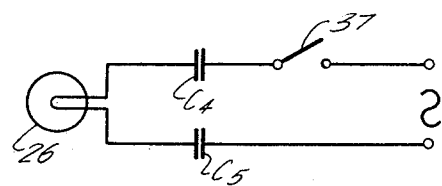
FIG.5
FIG.6

United States Patent Office 3,396,949
Patented Aug. 13, 1968

3,396,949
AERATOR FOR WATER-CONTAINING VESSEL
Nicholas Tsarnas, 2724 Linden Blvd.,
Brooklyn, N.Y. 11208
Continuation-in-part of application Ser. No. 433,124,
Feb. 16, 1965. This application Mar. 22, 1967, Ser.
No. 626,363
2 Claims. (Cl. 261—64)

ABSTRACT OF THE DISCLOSURE

The aerator includes a structure having a specific gravity greater than water to enable it to be continuously submerged in a water-containing vessel. The structure is provided with a manually controllable valve located on the surface thereof, and a conduit is connected at one end to the valve and is connectible at the other end thereof to an air supply source. As added features, illuminating means are provided in the structure, and suitable circuitry for intermittently energizing the same.

Disclosure

The instant application is a continuation-in-part of my copending application Ser. No. 433,124, filed Feb. 16, 1965, and now abandoned.

My invention relates to aerators, and more particularly, to aerators for water-containing vessels which have the capability of illuminating the interior of the vessels.

In water-containing vessels for biota, such as aquaria or fish tanks, it is very necessary to continually maintain a fresh oxygen supply in the tank to provide a healthy well-aerated environment for the fish and other aquatic creatures and life in the tank. It is also desirable to have a convenient and simple source of illumination in the tank both to enable ready visual inspection of the inhabitants and contents thereof and to provide decorative embellishment in the tank, i.e., to provide an illuminated effect therein. An aerator providing the aforementioned necessary and desirable functions preferably should be in the form of an entity related to the sea and should have a structure that is of visual interest.

Accordingly, it is an object of my invention to provide an aerator for water-containing vessels in which aquatic flora and fauna are normally received that supplies fresh air continuously to the water.

It is another object of my invention to provide an aerator in accordance with the preceding object which is capable of illuminating the water-containing vessel.

It is an additional object of my invention to provide an aerator in accordance with the preceding object wherein the illumination afforded is intermittent.

It is a further object of my invention to provide an aerator in accordance with the previous objects which is in a form that elicits visual interest.

With the foregoing and other objects in view and in accordance with my invention, I provide an aerator for a water-containing vessel comprising a structure having a specific gravity greater than water to enable it to be constantly submerged in the vessel. There are also included a manually controllable valve located on the surface of the structure, and a conduit having one end thereof connected to an air supply source and the other end thereof terminating at the valve whereby the amount of air supplied to the water in the vessel is controllable in accordance with the control of the valve.

For a better understanding of the invention together with other and further objects thereof, reference is had to the following description taken in conjunction with the accompanying drawings, and its scope will be pointed out in the appended claims.

Figure 1:
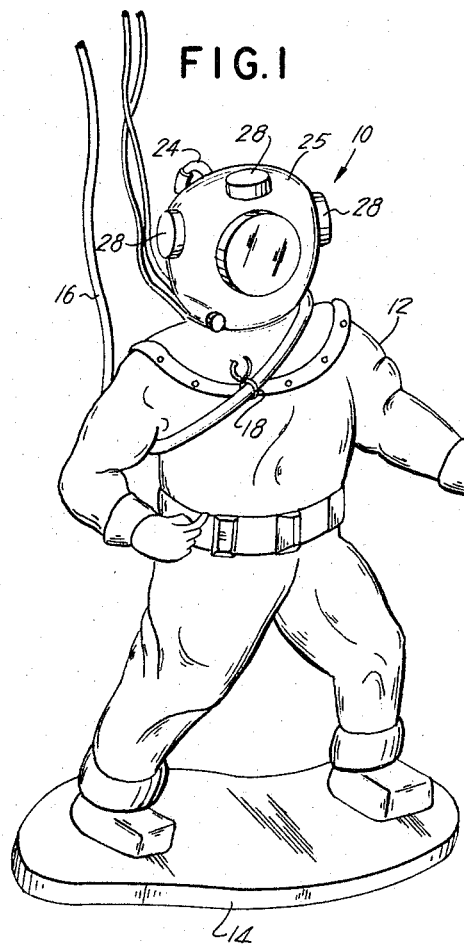
Figure 2:
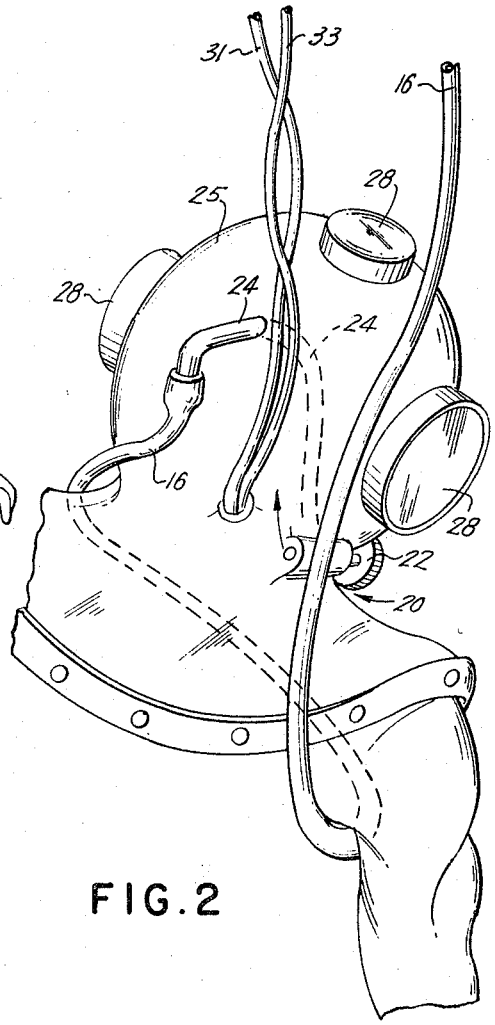
Figure 3:
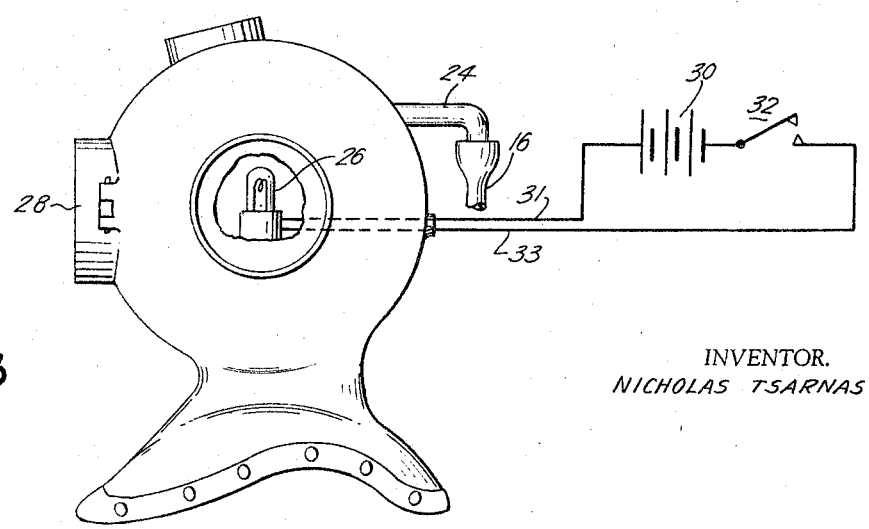

In the drawings:
FIG. 1 is a perspective view of an embodiment of an aerator for a water-containing vessel constructed in accordance with the principles of the invention;
FIG. 2 is an enlarged rear view of a portion of the aerator of FIG. 1 showing the air tube and electrical connections thereof;
FIG. 3 is a side view of the arerator partly broken away to show the lamp therein and diagrammatically showing circuitry for illuminating the aerator and consequently illuminating the vessel within which the aerator is submerged;
FIG. 4 is a view similar to that of FIG. 3 showing diagrammatically a modified embodiment of the circuitry which provides intermittent illumination of the aerator;
FIG. 5 is a perspective view of the lamp and circuit components of FIG. 4; and
FIG. 6 is a diagrammatic view of another embodiment of the circuitry for providing intermittent illumination.

Referring now to the drawings, the aerator 10 includes a structure 12 simulating an aquatic denizen or other structure that provides visual interest, the structure shown in the drawings by way of example being a simulated deep sea diver. To insure that the structure remains in one position, it is made of material having a specific gravity greater than that of water, such as plastic material, ceramic, glass, rustproof metal or the like. The diver is shown in a walking position and stands on a flat base 14 enabling the structure to be firmly situated on the bottom of a water-containing vessel such as a fish tank or other vessel containing biota, i.e., aquatic flora and fauna, which constantly require freshly oxygenated water for the healthy existence thereof. A conduit in the form of a tube 16, adapted to be connected at one end thereof to a source of air (not shown), is wrapped arond the structure 12 so that it is firmly anchored thereto. To further insure that the tube 16 is securely anchored, it is attached by a suitable clip 18, for example, or any other conventional fastener, to a location on the structure 12.

An air venting valve 20 manually controllable by a knob 22 associated therewith is mounted on the structure 12. The other end of the tube 16 is connected to the valve 20 through a connecting tube 24 extending into the structure 12 and to the valve 20 as shown in FIG. 2.

At least a portion 25, i.e., the hemlet, of the structure 12 is made hollow to permit an electric lamp or bulb 26 of comparatively low voltage to be inserted therein. Portion 25 has, disposed around the peripheral surface thereof, a plurality of mutually spaced windows generally designated by the reference numeral 28 and having panes of transparent material such as glass, plastic or the like. As shown in FIG. 3, the lamp bulb 26 is adapted to be selectively connected to an electrical power source 30 in the form of a battery through electric conductors 31 and 33 and a switch 32.

During use, the aerator 10 is placed in the water-containing vessel such as the fish tank for example, the base 14 of the aerator being superimposed on the bottom wall of the vessel, and is submerged so that at least the valve 20 is under water, the valve 20 having been previously opened to the extent necessary to provide sufficient aeration of the water. By closing the switch 32 to illuminate the lamp 26, the light therefrom is radiated through the windows 28 to substantially uniformly illuminate the surrounding water medium and interior of the vessel and the objects and life contained therein.

In FIG. 4 there is shown diagrammatically a circuit which permits the lamp 26 in the helmet 25 to be energized intermittently so as to provide a blinking light. The actual structure which includes the circuitry components and lamp of FIG. 4 is shown in FIG. 5. A plug unit 34 having an insulated housing such as of a suitable plastic material, contains all of the components shown within the dotted rectangle of FIG. 4. The components are connected in a four-legged bridge, two of the legs having a resistor $R_1$, $R_2$ respectively, and the other two legs having respectively a serially connected resistor $R_3$, $R_4$ and capacitor $C_1$, $C_2$, one of the other two legs also including a diode D connected between the resistor $R_3$ and capacitor $C_1$. A capacitor $C_3$ connects points located between the resistors $R_1$ and $R_3$ on the one hand and $R_2$ and $R_4$ on the other hand. Two leads 35 and 36 extend from the housing 34 and are connected to the lamp bulb 26. Two plug members or prongs 37 also extend from the housing 34 for suitable insertion in a socket connected to a conventional household A.C. power line. A switch 38 is also connected in the circuit for opening or closing the same. Suitable values for the components of FIG. 4 are, for example, the lamp bulb is rated at 90 watts, each of the resistors is 33 kilohms and each of the capacitors is .1 microfarad.

When the switch 37 is closed due to the circuit configuration, the lamp 26 will be intermittently energized so as to provide blinking illumination of the helmet 25 and the nonillustrated surrounding fish tank.

A more simplified circuit for producing a blinking light is shown diagrammatically in FIG. 6 wherein a lamp 26 rated at 90 watts is serially connected between two capacitors $C_4$ and $C_5$ of .1 microfarad each which, are in turn, connected through the switch 37 to an A.C. source such as conventional house current.

What is claimed as new and desired to be secured by Letters Patent of the United States is:

1. Aerator for a water-containing vessel comprising a structure having a specific gravity greater than that of water to enable it to be continuously submerged in the vessel, a portion of said structure being hollow and having at least one translucent surface area, lighting means disposed within said hollow portion for illuminating the vessel, said lighting means being an electric bulb, means located outside of the vessel and electrically connected to said electric bulb for intermittently energizing the same to provide blinking illumination, said means located outside of the water comprising a plurality of electrically connected components all enclosed in a single plug-in housing, said electrical components being connected in a four-legged bridge circuit, two of the legs including a resistor respectively, and the other two legs respectively having a serially connected resistor and capacitor, one of the other two legs also including a diode connected between the resistor and capacitor of said leg, and a further capacitor connected at the junction of the legs of said bridge circuit, valve means located on the surface of said structure, and a conduit connected at one end thereof to said valve means and being connectible at the other end thereof to an air supply source, said valve means being manually controllable for venting in the water a predetermined amount of air supplied thereto.

2. Aerator according to claim 1 wherein said structure is a simulated deep-sea diver having a flat supporting base for stably supporting the same on the bottom of the vessel, said hollow portion being the helmet of said simulated deep-sea diver.

References Cited

UNITED STATES PATENTS

| | | | |
|---|---|---|---|
| 1,377,404 | 5/1921 | Deam | 2—2.1 |
| 1,389,132 | 8/1921 | Galavan. | |
| 1,940,959 | 12/1933 | Lowry et al. | 261—121 |
| 2,593,988 | 4/1952 | Cousteau | 128—142.5 |
| 2,847,973 | 8/1958 | Pugh | 119—5 |
| 2,891,195 | 6/1959 | Smyth | 340—81 X |
| 3,077,697 | 2/1963 | Fry | 119—5 X |

FOREIGN PATENTS 608,053  9/1948  Great Britain.

RONALD R. WEAVER, *Primary Examiner.*